US012494355B2

(12) United States Patent
Räther et al.

(10) Patent No.: US 12,494,355 B2
(45) Date of Patent: Dec. 9, 2025

(54) METHOD AND DEVICE FOR THE QUANTIFICATION OF TARGET ION SPECIES

(71) Applicant: Bruker Daltonics GmbH & Co. KG, Bremen (DE)

(72) Inventors: Oliver Räther, Lilienthal (DE); Karsten Michelmann, Bremen (DE)

( * ) Notice: Subject to any disclaimer, the term of this patent is extended or adjusted under 35 U.S.C. 154(b) by 506 days.

(21) Appl. No.: 17/813,363

(22) Filed: Jul. 19, 2022

(65) Prior Publication Data

US 2023/0028227 A1 Jan. 26, 2023

(30) Foreign Application Priority Data

Jul. 21, 2021 (DE) ......................... 102021118838.5

(51) Int. Cl.
*H01J 49/00* (2006.01)

(52) U.S. Cl.
CPC ................................ *H01J 49/0036* (2013.01)

(58) Field of Classification Search
None
See application file for complete search history.

(56) References Cited

U.S. PATENT DOCUMENTS 5,247,175 A 9/1993 Schoen et al.
2013/0309774 A1 11/2013 Zabrouskov et al.
2018/0342381 A1 11/2018 Rule et al.
2020/0381232 A1* 12/2020 Berg .................. H01J 49/0036

FOREIGN PATENT DOCUMENTS

EP 4047371 A1 8/2022
WO 2018020363 A1 2/2018
WO 2018042454 A2 3/2018

OTHER PUBLICATIONS

Ralser, Stefan, et al. “Extracting cluster distributions from mass spectra: IsotopeFit.” International journal of mass spectrometry 379 (2015): 194-199. (Year: 2015).*
Raznikov, V.V. et al., “The regularized inverse convolution approach to resolving overlapping mass spectral peaks”, The International Journal of Mass Spectrometry and Ion Process, v. 103, No. 2-3, (1991) pp. 67-69.
Virreira Winter et al., “EASI-tag enables accurate multiplexed and interference-free MS2-based proteome quantification”, Nat. Methods 2018, pp. 527-530.
Ogata et al., “Extending the Separation Space with Trapped Ion Mobility Spectrometry Improves the Accuracy of Isobaric Tag-Based Quantitation in Proteomic LC/MS/MS”, Anal. Chem. 2020, 92, pp. 8037-8040.

(Continued)

*Primary Examiner* — Raymond L Nimox
(74) *Attorney, Agent, or Firm* — Benoȋt & Côté Inc.

(57) ABSTRACT

Disclosed is a method and device for the mass spectrometric quantification of two or more known target ion species, in which a mass spectrometric signal, composed of signal components of the two or more target ion species, which are not mass resolved in the mass spectrum, is weighted with quantification functions and summed, and a quantification parameter is determined for the two or more target ion species from the weighted sums.

12 Claims, 14 Drawing Sheets

(56) References Cited

OTHER PUBLICATIONS

Robitaille et al. "Improved identification, quantification accuracy, and workflow efficiency using a modified quadrupole Orbitrap mass spectrometer and Tandem Mass Tags (TMT) approach", 67th ASMS Conference on Mass Spectrometry and Allied Topics, MP 735, 2019.

Blom, F. Karl, "Utility of peak shape analyses in determining unresolved interferences in exact mass measurements at low resolution", Journal of the American Society for Mass Spectrometry vol. 9, pp. 789-798 (1998).

* cited by examiner

METHOD AND DEVICE FOR THE QUANTIFICATION OF TARGET ION SPECIES

BACKGROUND OF THE INVENTION

Field of the Invention

The invention relates to mass spectrometric methods and devices for the quantification of target ion species whose masses are known, and particularly the quantification of peptide ion species which are labeled with isobaric mass tags.

Description of the Related Art

Proteomics is a core technology in the biological sciences, whose objective is to explain the molecular mechanisms of illnesses at the protein level, and to find biomarkers and use them in clinical diagnostics. This is typically achieved through mass spectrometric identification of the proteins and their modifications which are present in a sample. The discipline of proteomics has developed at the interface between instrument design, biochemistry, and bioinformatics. The instruments used in proteomics usually couple mass spectrometry with liquid chromatography (LC) or with both liquid chromatography and ion mobility spectrometry (IMS).

In addition to the identification of proteins and their modifications, their quantification is playing an ever-increasing role in explaining the molecular mechanisms of illnesses and diagnosing them in clinical routine in the future. Proteomics allows a quantitative comparison of one type of proteome from different samples (e.g., from different test subjects or a time series of one test subject) or a quantitative comparison of different types of proteomes. The mass spectrometric quantification here can be undertaken either label-free or using labeling reagents.

Various types of labeling for a mass spectrometric quantification are known, such as stable isotope labeling with amino acids in cell culture (SILAC) or labeling by means of isobaric mass tags (such as iTRAC™ (isobaric Tags for Relative and Absolute Quantitation), TMT™ (Tandem Mass Tag), or EASI Tag (Easily Abstractable Sulfoxide-based Isobaric Tag; published in: Virreira Winter et al., Nat. Methods 2018, 15, 527-530).

An isobaric mass tag consists of three components, namely one reactive group to couple the mass tag to the target species, one reporter group, and one mass balance group. The latter two groups are connected via a cleavable chemical unit such that the reporter group is separated from the complementary rest (target species with isobaric residual labeling) during a fragmentation of the labeled target species in the gaseous phase. A crucial aspect for quantification with different isobaric mass tags is that the masses of the reporter groups of the isobaric mass tags are different, but the total mass of the isobaric mass tags is identical. The mass balance groups balance the mass differences, which are caused by the insertion of different isotopes into the reporter groups. In the isobaric mass tags, the heavy isotopes are therefore distributed differently over the reporter group and the mass balance group. The signals of the reporter ion species created in the fragmentation can principally be distinguished in the mass spectrum. The target species being analyzed can be quantified relative to each other via the relative ratios of the signals of the reporter groups.

The quantification of two or more proteome samples by means of isobaric mass tags is typically conducted as follows. The proteome samples are subjected to an enzymatic digest separately from each other. The digest peptides thus produced are labeled with one of the different isobaric mass tags before all the digested and differently labeled digest peptides of the proteome samples are brought together and analyzed. The digest peptides are usually separated by means of liquid chromatography (LC), and optionally also by means of ion mobility spectrometry (IMS) in the gaseous phase, and analyzed mass spectrometrically. A peptide species which is present in each enzymatically digested proteome sample but is labeled with different isobaric mass tags elutes in the LC separation at the same retention time and is not separated by the optional mobility separation either. Since the isobaric mass tags have the same total mass, the labeled ion species generated from a peptide species appear as a single signal in a mass spectrum (MS1) which has been acquired. After the labeled ion species of a peptide species have been isolated according to retention time, mobility (optional), and mass, and subsequently fragmented, the principally distinguishable signals of the reporter ion species are measured in a fragment mass spectrum (MS2 or MS/MS) and used for the quantification of the peptide species in the proteome samples. A protein species is quantified via one or more quantified peptide species, which are produced from the protein species by the enzymatic digest.

The signals of the reporter ion species are in the low mass range of the fragment mass spectra, where they are not usually superimposed with other fragment ion species. In addition to the reporter ion species, the fragmentation also creates so-called complementary fragment ion species, which have the labeled mass balance group and the peptide species, and which are also distinguishable in the fragment mass spectrum by means of the mass balance group, and can be used for the quantification.

The biggest advantage of quantification by means of isobaric mass tags consists in the multiplexing capability, i.e., the fact that many (currently up to 16) samples can be quantified simultaneously. The publication by Ogata et al. (Anal. Chem. 2020, 92, 8037-8040: "Extending the Separation Space with Trapped Ion Mobility Spectrometry Improves the Accuracy of Isobaric Tag-Based Quantitation in Proteomic LC/MS/MS") investigates the problem of the isobaric interference which results when using the quantification by means of isobaric mass tags if more than one labeled ion species is selected and fragmented in the isolation (LC/MS or LC/IMS/MS). The isobaric interference is investigated for different mass spectrometric systems which have an electrostatic ion trap (Orbitrap®) or a time-of-flight separator as the mass analyzer.

FIG. 1 is a schematic representation of a hybrid mass spectrometric system (100) known from the Prior Art, which is preferably suitable for quantification by means of isobaric mass tags. The hybrid mass spectrometric system (100) comprises an LC separation device (110), an ion source (121), a mobility separator (144), a quadrupole mass filter (150), a fragmentation cell (160), a time-of-flight mass analyzer (170), and a device (180) to record and process mass spectrometric data. Before being fragmented, a target ion species is isolated by temporal separation according to retention time and mobility, and also by being filtered according to mass in the quadrupole mass filter (150).

The mobility separator (144) can be a TIMS-type (TIMS=Trapped Ion Mobility Spectrometry) separator, which is preferably operated in a parallel accumulation mode. In this mode, ions are accumulated in an upstream part of the mobility separator (144) or an upstream ion trap (not shown), while previously accumulated ions are analyzed in a downstream part of the mobility separator (144) at the same time. The time-of-flight mass analyzer (170) is typically a time-of-flight mass analyzer with orthogonal ion injection (OTOF) and at least one reflector.

The LC separation device (110) is coupled to the ion source (121), which is typically an electrospray ion source (ESI) operated at atmospheric pressure. The ions produced in the chamber (120) are fed into a first vacuum chamber (140) via a transfer capillary (141) before being deflected into an RF ion funnel (143) by a repulsive electric DC potential applied to a deflection electrode (142). The RF ion funnel (143) guides the ions to the mobility separator (144). The ion species released from the mobility separator (144) and separated according to mobility are guided to the quadrupole mass filter (150), which can transmit ions or filter them according to mass. An ion species isolated in the quadrupole mass filter (150) is guided to the fragmentation cell (160), in which the fragment ion species can be produced from the ion species. The peptide ion species labeled with isobaric mass tags are preferably fragmented by collision-induced dissociation (CID), but can also be fragmented by other types of fragmentation such as electron-transfer dissociation or photodissociation. The fragmentation can be switched on and off. Compared to the temporal duration of a substance batch of an ion species downstream of the mobility separator (144), the time-of-flight mass analyzer (170) has such a short acquisition time for a mass spectrum that several (fragment) mass spectra can be acquired for each ion species contained in the substance batch and separated according to mobility.

The mass spectrometric system (100) is controlled by the device (180), which contains a detection unit (181), a central processor (182) (CPU), and a data storage device (183), via the line (185). The components of the device (180) are connected with each other via a local bus (184), e.g., via a Peripheral Component Interconnect Express (PCI express) Bus. The detection unit (181) is connected to an ion detector (171) of the time-of-flight mass analyzer (170), which is located at the end of the flight path and generates a pulsed electron current for impinging ion pulses. The ion detector (171) typically contains a secondary electron multiplier such as a microchannel plate. The detection unit (181) has an analog-to-digital converter, which is used to digitize the electron current generated in the detector, and a data processing unit. The data processing unit can determine the intensities and flight times of individual signals in the time-of-flight mass spectrum in real time, for example.

As has been described above, labeling with isobaric mass tags allows several (currently up to 16) samples to be quantified in parallel. However, isobaric reporter groups are also used for this, some of which have a mass difference of only a few millidaltons (dalton=atomic mass unit) (isobaric reporter ion species), which means the mass analyzers used need to have a very high mass resolution. However, time-of-flight mass analyzers, in particular, have a lower mass resolution in the lower mass range than in the higher mass range. Electrostatic ion traps such as the Orbitrap® or magnetic ICR (ion cyclotron resonance) ion traps, in contrast, have a higher mass resolution in the low mass range than in the higher mass range, but require sufficient time to acquire a mass spectrum with sufficient mass resolution.

Robitaille et al. disclose in a poster (67th ASMS Conference on Mass Spectrometry and Allied Topics, MP 735: "Improved identification, quantification accuracy, and workflow efficiency using a modified quadrupole Orbitrap mass spectrometer and Tandem Mass Tags (TMT) approach") that the acquisition rate of fragment mass spectra for an electrostatic ion trap such as the Orbitrap® can be increased when the mass resolution for isobaric reporter ion species in the fragment mass spectra is improved by the use of a "Phased Spectrum Deconvolution" method (ΦSDM).

There is still a significant need to simultaneously and quickly quantify the biomolecule species, e.g., peptide species, labeled with isobaric mass tags, of as many samples as possible, particularly in clinical diagnostics. The use of isobaric mass tags represents a particular challenge here, because compact time-of-flight mass analyzers often do not have the mass resolution required to measure the signals of isobaric reporter ion species resolved according to mass, while other mass analyzers require a long measuring period to measure their signals with mass resolution.

SUMMARY OF THE INVENTION

The present invention provides a method for the mass spectrometric quantification of two or more known target ion species, of which at least two differ in their masses. The method according to the invention comprises the following steps:

- provide quantification functions whose number is at least as large as the number of target ion species of different masses;
- provide a mass spectrum with a signal composed of signal components of the two or more target ion species, which are not mass resolved in the mass spectrum;
- sum the signal weighted with the quantification functions, and
- determine a quantification parameter for the two or more target ion species from the weighted sums, where (a) the weighted sums form the inhomogeneous part of a system of equations and the quantification parameter provides the solution of the system of equations, or is derived from it, or (b) the weighted sums or parameters derived therefrom serve as input values for prespecified lookup tables, which contain the quantification parameter as the output value.

The weighted sums result from the summation of the signal weighted with the quantification functions. The summation step also comprises integration of the signal weighted with the quantification functions, in particular integration around the signal. The summation is preferably carried out where the signal exceeds a certain (absolute or relative) threshold value. The quantification functions are selected such that at least some are linearly independent, i.e., they cannot be represented as a linear combination of the other quantification functions. The number of linearly independent quantification functions corresponds at least to the number of target ion species of different masses.

The quantification parameter can be a ratio of the signal components of two target ion species, for example, or the signal component from a single target ion species of the signal. The intensity of the individual target ion species can be determined from the signal component of the individual target ion species and the intensity of the signal, and compared with the intensities of (isobaric) target ion species of other signals. The target ion species can also be quantified in absolute terms by optionally using ion species whose concentrations are specified or known (reference or standard species).

It is preferable for the mass positions of the target ion species to be known. In addition to the quantification parameters for the target ion species, the solution of the system of equations can also contain a mass shift of the signal, for example, which results from a joint shift of the signal components. According to the invention, it is thus not necessary to know the mass positions of the individual signal components but only the (relative or absolute) mass separations of the signal components.

The solution of the system of equations is preferably calculated directly from the weighted sums without any iterative approximation steps. The method according to the invention thus differs in particular from time-consuming optimization methods where curves of two or more target ion species are adapted to the signal. In information technology and digital technology, lookup tables (conversion tables) are used to define information in advance, and later avoid the need for complex computations. The quantification parameter is determined in advance as the output values for certain input values (weighted sums or quantities derived therefrom) and stored as a table in a storage device. A lookup table can have one or more independent input values.

The fact that the signal components of the two or more target ion species of which the signal is composed are not mass resolved in the mass spectrum can mean, for example, that the signal does not have a local maximum for every signal component, or that the full width at half maximum of the signal is greater than the separation of two target ion species, or that the ratio of the mean mass of the target ion species and the smallest mass difference between the target ion species is greater than the mass resolution which is achieved in the mass spectrum provided around the signal. The full width at half maximum of the signal provided can be more than a factor of 1.5, 2, or 5 greater than the separation of two target ion species.

The mass spectrum provided can be acquired with a time-of-flight mass analyzer, or an electrostatic ion trap (Orbitrap®, Cassini ion trap), or a magnetic ICR (ion cyclotron resonance) ion trap, for example. In the case of electrostatic or magnetic ion traps, a transient analog image current signal is typically acquired with a detector, and the signal is the Fourier-transformed image current signal of the target ion species. The mass axis of the mass spectrum can, but does not have to be, a calibrated mass axis or calibrated m/z axis (mass-to-charge ratio); it can also be referenced to a physical quantity (e.g., time of flight or frequency), from which a calibrated mass axis or m/z axis can be derived. A time-of-flight axis results, for example, in an obvious way when the mass spectrum has been acquired with a time-of-flight mass analyzer. A frequency axis results, for example, after a Fourier transform of a measured transient image current signal (time signal), which is typically acquired with an electrostatic ion trap (Orbitrap® or Cassini trap) or a magnetic ICR (ion cyclotron resonance) ion trap.

The target ion species can particularly be isobaric ion species or isobaric fragment ion species, in which the sum of the number of protons and the number of neutrons is the same, but which differ in the number of protons or the number of neutrons, and can therefore have a mass difference of a few millidaltons. In particular, target ion species are characterized by an individual mass-to-charge ratio m/z. Molecular ions of different isotopic composition must therefore already be considered to be individual target ion species. The target ion species of different masses differ, in particular, in the fact that their masses are preferably separated by less than 100 millidaltons, preferably by less than 10 millidaltons, and in particular by less than 1 millidalton. The mass resolution m/Δm of the mass analyzer used for the acquisition of the mass spectra is preferably less than 15,000, preferably less than 10,000, and in particular less than 5,000.

In a preferred embodiment, the target ion species are isobaric fragment ion species which are produced by fragmentation from precursor ion species labeled with isobaric mass tags. The precursor ion species all have the same species of biomolecule and different isobaric mass tags, and are isolated according to mass and (optionally) mobility from other precursor ion species before the fragmentation. The precursor species with isobaric labels, from which the precursor ion species are generated in an ion source of a mass spectrometric system, are typically separated by means of liquid chromatography or electrophoresis in the liquid phase. The precursor ion species can have peptide species or other types of species of biomolecules, which are labeled with isobaric mass tags, e.g., lipid species, glycan species, saccharide species and similar.

The isobaric fragment ion species are preferably isobaric reporter groups, but can also be complementary fragment ion species which have the mass balance groups and the biomolecular species, and which can likewise be distinguished in the fragment mass spectrum by means of the mass balance groups. A peptide species can, for example, be a digest peptide of an enzymatically digested protein, where the quantification of the fragment ion species is used for quantifying the digest peptide or the protein in different proteome samples.

The system of equations is preferably a system of linear equations:

$$g_i = \sum_{j=1}^{N} Q_{ij} I_j \text{ with } i, j = 1 \ldots N$$

where N is the number of target ion species, Qij are matrix components of the system of linear equations, and Ij are quantification parameters of the target ion species. The signal S(x) is composed of signal components of the target ion species:

$$S(x) = \sum_{j=1}^{N} I_j S_j(x)$$

where $S_j(x)$ is the individual signal of the j-th target ion species normalized to one, for example. The variable x can be (as has already been described above) a mass-related physical quantity (e.g., time of flight or frequency). The weighted sums gi are obtained by summing the signal S(x), which is weighted with the quantification functions Qi(x) and form the inhomogeneous part of the system of linear equations:

$$g_i = \int Q_i(x) \cdot S(x) dx = \int Q_i(x) \cdot \left( \sum_{j=1}^{N} I_j S_j(x) \right) dx = \sum_{j=1}^{N} \Bigg( \overbrace{\int Q_i(x) \cdot S_j(x) dx}^{Q_{ij}} \Bigg) I_j$$

The matrix components Qij of the linear solution system can be determined by measuring and normalizing a non-composite individual signal for each target ion species, for example. The matrix components Qij result from the summation of the individual signals Sj(x) which are weighted (normalized) with the quantification functions Qi(x). The quantification functions here are selected such that the rank of the constant matrix components Qij corresponds at least to the number of target ion species of different masses. The number of linearly independent quantification functions can be greater than the number of target ion species of different masses if it is acceptable for the system to be overdetermined. Direct numerical methods, such as the determinant method, are preferably used to solve the system of linear equations, without gradually improving an initial approximation, as is the case with iterative methods.

The lookup tables can likewise be determined from measured and normalized individual signals of the target ion species, or measurements of composite signals, for which the quantification parameters are known through appropriate sample preparation.

The quantification functions can be, for example (a) polynomials of different order, (b) delta functions or rectangular functions, which are preferably all centered near the respective maximum position of the target ion species, (c) step functions, where each step position is preferably near the respective maximum position of the target ion species, (d) harmonic functions of different periodicity, or (e) functions used for a wavelet transform. The summing of the signal weighted with a delta function corresponds to an interpolation of the signal at the position of the delta function, therefore preferably at the maximum position of one of the target ion species. When, as is usually the case, the signal on the mass axis is only given for sampling points on the mass axis, the interpolation can consist in using the signal value of the sampling point which is closest to the position of the delta function, for example. If the delta function is centered between two sampling points, the signal there can be interpolated, extrapolated, or approximated by regression from the signal values of the two sampling points or further sampling points. The method according to the invention can be used with a saturated signal also, i.e., when the signal exceeds a certain maximum value for certain regions and is cut off there. The quantification functions can be selected for saturated signals such that they are equal to zero at least at positions where the signal is saturated.

In a first embodiment, the signal is composed of the signal components of two target ion species. The signal is weighted with a constant function of value one and the mass axis of the acquired mass spectrum. The two weighted sums are used to calculate the centroid of the signal, which is used as the input value for a lookup table to determine the intensity ratio of the signal components of the two target ion species.

From the publication by Blom (J. Am. Soc. Mass Spectrom., 1998, 9, 789-798: "Utility of Peak Shape Analyses in Determining Unresolved Interferences in Exact Mass Measurements at Low Resolution") it is known only that moments of a measured signal (such as the centroid) can be used to determine unresolved superpositions in a measured mass spectrometric signal.

In a second embodiment, the signal is likewise composed of the signal components from two target ion species. The signal is weighted with two delta functions, which are centered at the two maximum positions of the two target ion species. The weighted sums correspond to the interpolated signal values at the maximum positions of the two target ion species, whose ratio is used as the input value for a lookup table to determine the intensity ratio of the signal components of the two target ion species. Another lookup table can also have the signal component or the intensity of one of the two target ion species as the output value.

In a third embodiment, several mass spectra with the signal are provided, the weighted sums being calculated separately in each case for individual mass spectra or for partially summed mass spectra before being summed up separately according to quantification function to determine the quantification parameters therefrom. Partially summed means that a certain number of mass spectra are summed true to mass to improve the signal-to-noise ratio, in particular. The weighted sums can each be calculated separately for each individual spectrum before being summed separately according to quantification function to determine the quantification parameters therefrom.

In a fourth embodiment, several mass spectra with the signal are provided, the weighted sums each being calculated separately for individual mass spectra or for partially summed mass spectra and quantification parameters for the individual mass spectra or partially summed mass spectra being determined therefrom. Representative quantification parameters result as (weighted) averages from the quantification parameters calculated separately for individual spectra or partially summed spectra. First quantification functions can be used for separate calculation of the weighted sums of a first individual mass spectrum or a first partially summed mass spectrum, and second quantification functions can be used for separate calculation of the weighted sums of a second individual mass spectrum or a second partially summed mass spectrum. The first and second quantification functions are different.

A separate calculation of the weighted sums or the quantification parameters makes it possible to examine whether the values of the weighted sums or quantification parameters change during acquisition of the individual mass spectra. If the target ion species are isolated from other ion species according to mobility and mass, but overlap with other ion species in respect of their mobility, a resulting isobaric interference can be read off by means of changes in the weighted sums or quantification parameters and corrected, where necessary.

The present invention, furthermore, provides a device for the quantification of two or more target ion species, said device containing a data processing unit which is designed and configured to execute the method according to the invention, e.g., programmed accordingly. The device according to the invention is preferably connected to a detector of a mass analyzer. In the case of a time-of-flight mass analyzer, the device preferably has a detection unit in which an analog-to-digital converter and the data processing unit are integrated. The data processing unit here is preferably designed such that the weighted sums for each individual mass spectrum are determined in real time.

The method according to the invention is particularly suitable for mass spectrometric systems where the mass positions of the signal components of the target ion species are stable over a relatively long measuring period (e.g., during an LC separation run). However, a shift of the signal which occurs during a measurement can be compensated by additionally measuring the positions of the signal components of individual target ion species during the measurement and using these to correct the lookup tables or the constant matrix components of the system of linear equations. Furthermore, a shift of the signal which results from a joint shift of the signal components can be determined as a partial solution of a system of (non-linear) equations.

An important advantage of the present invention consists, in particular, in the fact that compact time-of-flight mass analyzers can be used to quantify isobaric reporter ion species, where the mass resolution of these mass analyzers in the mass range of the isobaric reporter ion species is typically not sufficient to measure the signal components of the reporter ion species with mass resolution. A further advantage of the present invention consists in the fact that existing data processing units can be adapted such that it is possible to determine the weighted sums of individual spectra in real time even when they are acquired with an acquisition rate of more than 1 kHz, 5 kHz, or 10 kHz.

Furthermore, signals can be acquired with electrostatic or magnetic ion traps with a shorter measuring time, since no mass-resolved signals are necessary for a quantification of the target ion species with the method according to the invention. Conversely, this means that the acquisition rate of the mass spectra, and thus the number of quantified target ion species per unit of time, can be increased significantly.

BRIEF DESCRIPTION OF THE DRAWINGS

The disclosure can be better understood by referring to the following illustrations. The elements in the illustrations are not necessarily to scale, but are primarily intended to illustrate the principles of the disclosure (mostly schematically).

FIG. 3A shows a section from a simulated mass spectrum of a time-of-flight mass analyzer with the signal (30), composed of the two signal components (31, 32) of target ion species, which are not mass resolved in the mass spectrum.

FIG. 3B shows one of the two quantification functions (33, 34) together with the composite signal (30).

FIG. 3C shows the other of the two quantification functions (33, 34) together with the composite signal (30).

FIG. 3D shows the composite signal (30) together with the centroid (35) of the signal (30), said centroid resulting from weighted sums of the signal (30) as a derived quantity.

FIG. 3E is a logarithmic graphic representation of the prespecified lookup table (36), which is used to determine the intensity ratio of the two signal components (31, 32).

FIG. 4A shows a section from a simulated MS2 spectrum of a time-of-flight mass analyzer with the signal (40), composed of two signal components (41, 42), of isobaric fragment ion species, which are not mass resolved in the MS2 spectrum.

FIG. 4B shows one of the two quantification functions (43, 44) together with the composite signal (40).

FIG. 4C shows the other of the two quantification functions (43, 44) together with the composite signal (40).

FIG. 4D shows the composite signal (40) with the weighted sums of the signal (45, 46), which correspond to the interpolated values of the signal (40) at the maximum position of each of the two signal components (41, 42).

FIG. 4E is a logarithmic graphic representation of the prespecified lookup table (47), which is used to determine the intensity ratio of the two signal components (41, 42).

DETAILED DESCRIPTION

Figure 2:
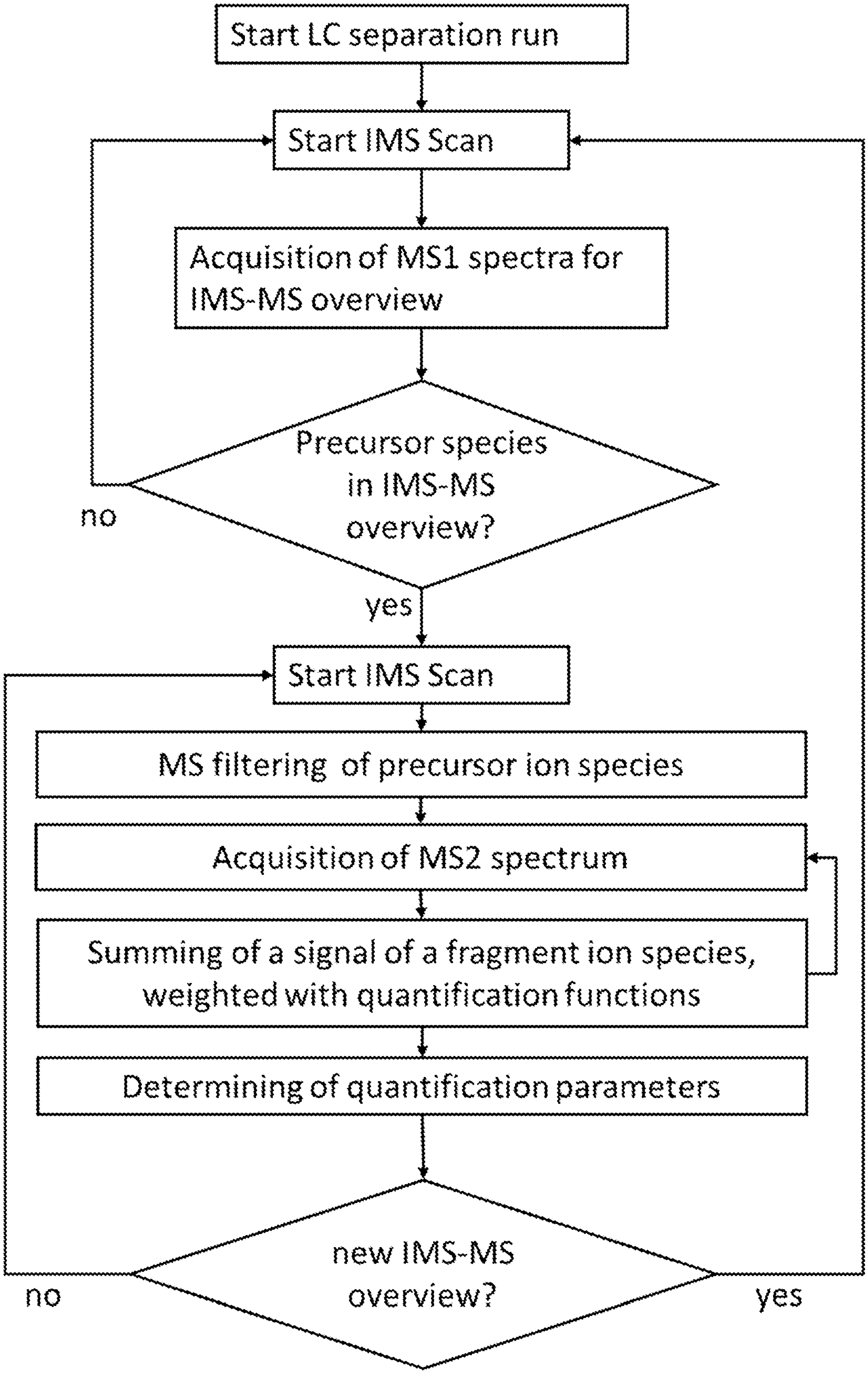
FIG. 2 shows a flow chart of a method according to the invention for the quantification of target ion species labeled with isobaric mass tags, said target ion species being isolated according to retention time, mobility, and mass before their fragmentation, and quantified by means of signals of reporter ion species or complementary fragment ion species.

FIG. 2 shows a flow chart for a method according to the invention for the quantification of precursor ion species labeled with isobaric mass tags, said precursor ion species being isolated according to LC retention time, mobility, and mass before their fragmentation, and quantified by means of signals of reporter ion species or complementary fragment ion species.

Figure 1:
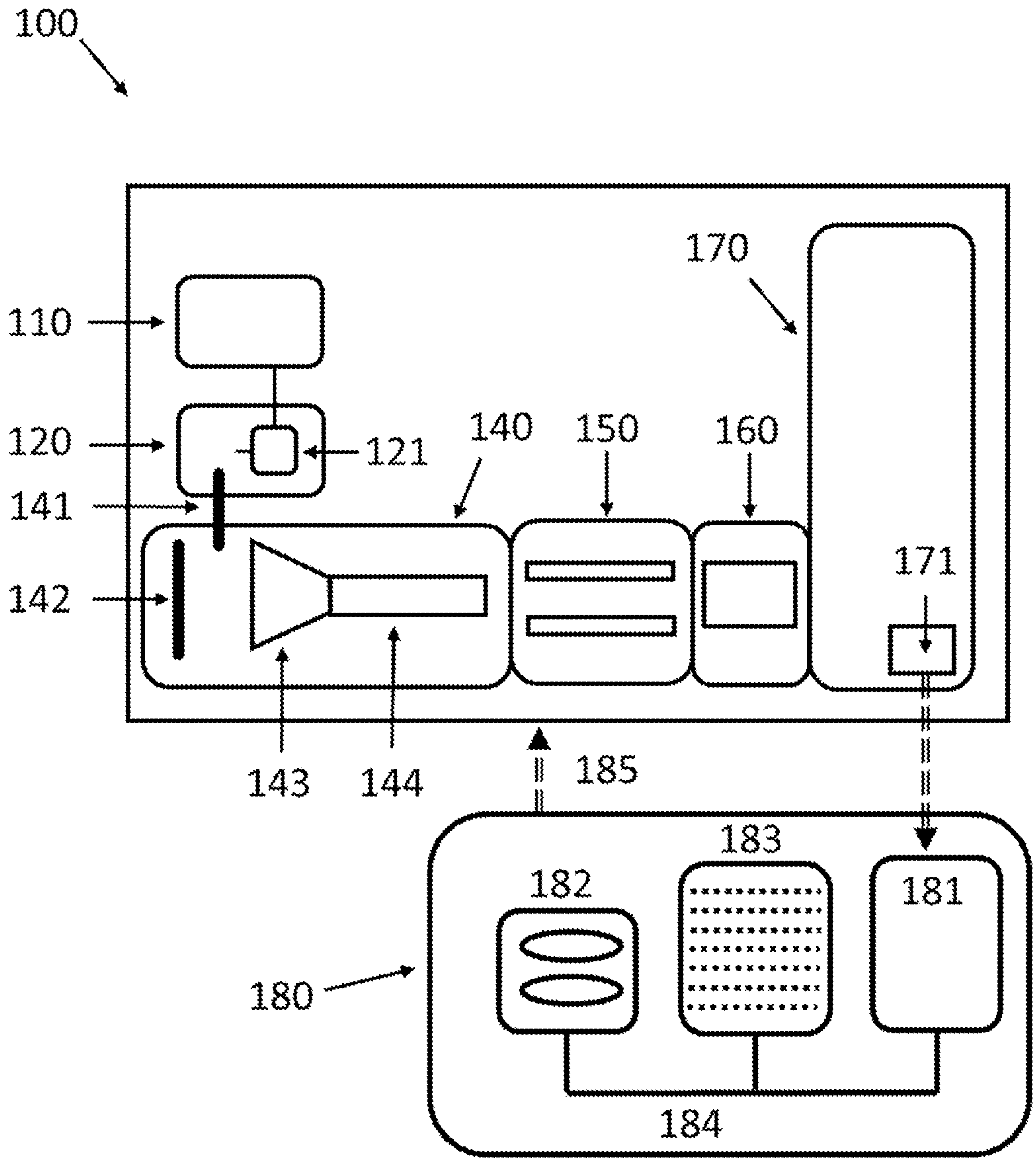
FIG. 1 (Prior Art)
FIG. 1 is a schematic representation of a hybrid mass spectrometric system (100) known from the Prior Art, which is suitable for quantification by means of isobaric mass tags. The hybrid mass spectrometric system (100) contains an LC or other separation device (110), an ion source (121), a mobility separator (144), a quadrupole mass filter (150), a fragmentation cell (160), a time-of-flight mass analyzer (170), and a device (180) to record and process mass spectrometric data.

The precursor species, from which the precursor ion species are produced in an ion source, can be digest peptides from several proteome samples, for example, where the digest peptides in each proteome sample are labeled with one of the different isobaric mass tags and combined afterwards. The method according to the invention can be carried out with the mass spectrometric system (100) depicted in FIG. 1, for example, whose detection unit has a modified data processing unit with which weighted sums of a composite signal of two or more isobaric fragment ion species are determined, from which quantification parameters of the two or more isobaric fragment ion species are determined.

The digest peptides, which are labeled and combined differently, are pre-separated in an LC separation run according to their retention time. After the LC separation run has started, the precursor ion species, which are produced from the labeled digest peptides in the ESI ion source (121), are separated in an IMS scan of the mobility separator (144) according to mobility in the gaseous phase, while MS1 spectra are continuously acquired with the time-of-flight mass analyzer (170), with both mass filter (150) and fragmentation cell (160) switched off. The MS1 spectra acquired during the IMS scan provide an IMS-MS overview, which is examined to establish whether specified precursor ion species are present at the time the IMS scan is acquired. The precursor ion species, whose retention time, mobility, and mass are known, can be found by a comparison with the mobility and the mass of signals in the IMS-MS overview and via the acquisition time of the IMS-MS overview during the LC separation run (retention time). The acquisition of IMS-MS overviews is repeated until at least one of the specified precursor ion species is present in an IMS-MS overview.

After a precursor ion species has been found, an IMS scan (separation) is started, where the mass filter (150) is switched during the period in which the precursor ion species leaves the mobility separator (144) such that during this period, only the precursor ion species can pass through the mass filter (150), as far as possible. The precursor ion species isolated in this way from other ion species according to mobility and mass is fragmented in the fragmentation cell (160), and an MS2 spectrum (fragment mass spectrum) is acquired. In the modified detection unit (181), signals of the fragment ion species (target ion species) are weighted with quantification functions, and weighted sums are calculated therefrom. The signals here are preferably those of reporter ion species with isobaric labels in the lower mass range of the MS2 spectrum. As a rule, a precursor ion species separated according to mobility has a substance batch with a duration of around one millisecond at the time-of-flight mass analyzer (170), which means that a plurality of MS2 spectra can be acquired for one precursor ion species at an acquisition rate of 10 kHz. In the modified detection unit (181), the weighted sums are typically determined in real time for each individual MS2 spectrum, and passed to the data storage device (183) via the local bus (184). The central processor (182) or further decentralized processors (not shown in FIG. 1) can determine quantification parameters for the fragment ion species, such as the intensity ratio of two isobaric reporter ion species. The intensity ratio and the intensity of the signal, which is composed of the isobaric reporter ion species, can be used to determine the intensity of each of the two isobaric reporter ion species and compare (quantify) them with the intensities of other reporter ion species present in the MS2 spectra. It is possible to determine the quantification parameters for each individual MS2 spectrum, or to first sum the weighted sums for all MS2 spectra of a fragment ion species and determine the quantification parameters therefrom. During an IMS scan, MS2 spectra of different precursor ion species, which can be separated according to mobility, can be acquired.

An IMS scan typically takes between 10 and 100 milliseconds. Therefore, several precursor ion species, separable according to mass and mobility, can be quantified during an IMS scan. Further IMS scans can follow to acquire MS2 spectra of other precursor ion species or acquire MS2 spectra of precursor ion species in two or more IMS scans before a new IMS-MS overview is acquired.

FIGS. 3A to 3E show in a first embodiment how, for a signal (30) composed of two signal components (31, 32), the intensity ratio S1/S2 of the two signal components (31, 32) can be determined by means of weighted sums and a prespecified lookup table (36).

Figure 3A:
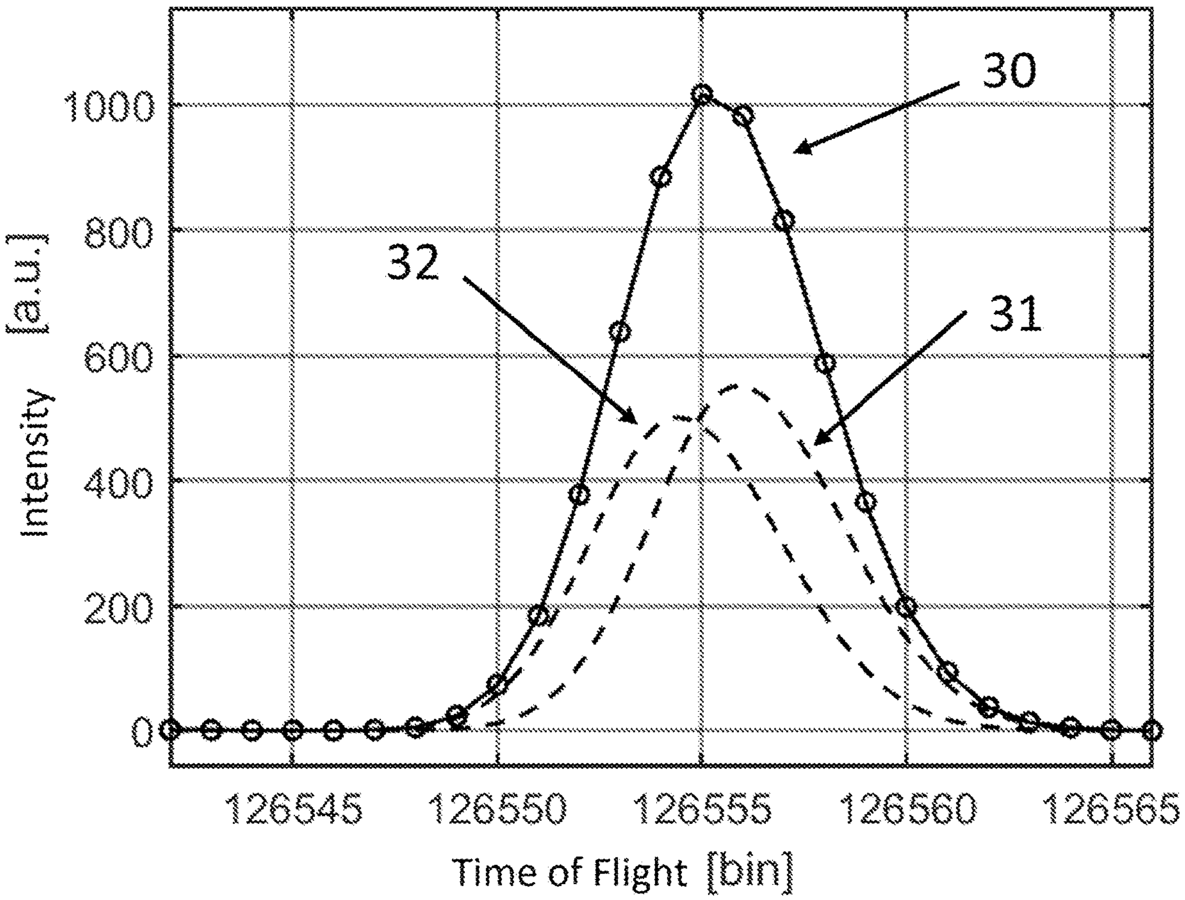
FIGS. 3A to 3E show in one embodiment how, for a signal (30) composed of two signal components (31, 32), the intensity ratio of the two signal components (31, 32) can be determined, by means of weighted sums and a prespecified lookup table (36).

FIG. 3A shows a section from a simulated mass spectrum of a time-of-flight mass analyzer with the signal (30), which is composed of the two signal components (31, 32) of two target ion species which are not mass resolved in the mass spectrum. An analog detector signal with a noise component is scanned with a typical sampling rate of 5 GS/s (giga-samples per second) and digitized with a 10-bit resolution. The circular symbols correspond to the digitized value pairs (time of flight, intensity) of the composite signal (30). The mass axis is a time-of-flight axis, where the scanning time points (bins) are given as whole numbers. The two signal components (31, 32) belong to two target ion species, for which a mass of around 128 daltons and a mass difference of three millidaltons is used. The simulated mass spectrum has a mass resolution of around 12,000, whereas a mass resolution of 42,000 would be required in order to resolve the two signal components (31, 32) as separate signals. The signal, which extends over a finite number of mass channels (bins), here around 25, of which for example 11 bins are used for the summation, can have been determined and extracted from a mass spectrum with a much higher number of bins, for example by using a peak picking algorithm. It is possible that a mass spectrum has a plurality of superimposed signals, which can be found by appropriate algorithms.

Figure 3B:
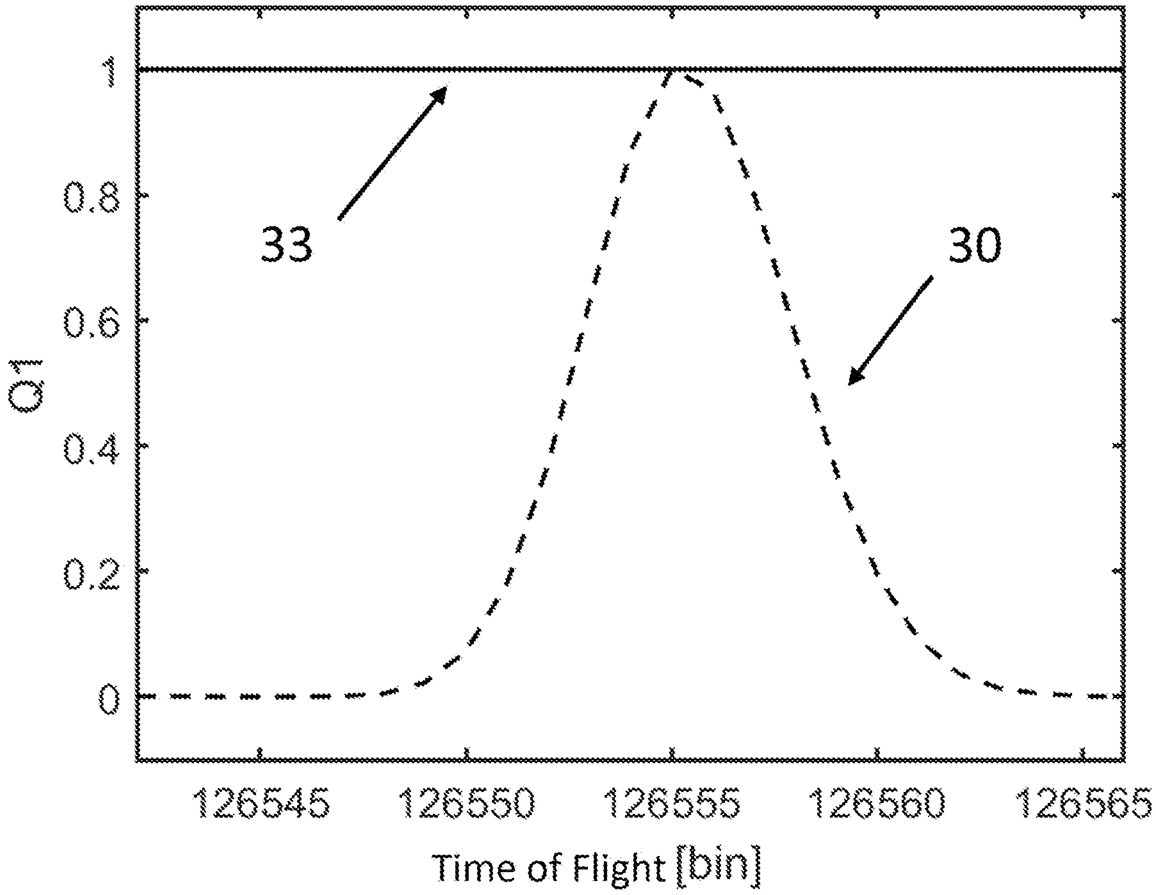

FIG. 3B shows a first quantification function (33) together with the composite signal (30). The first quantification function (33) is a constant function of value one. The summation of the signal (30), weighted with the first quantification function (33), gives a first weighted sum g1.

Figure 3C:
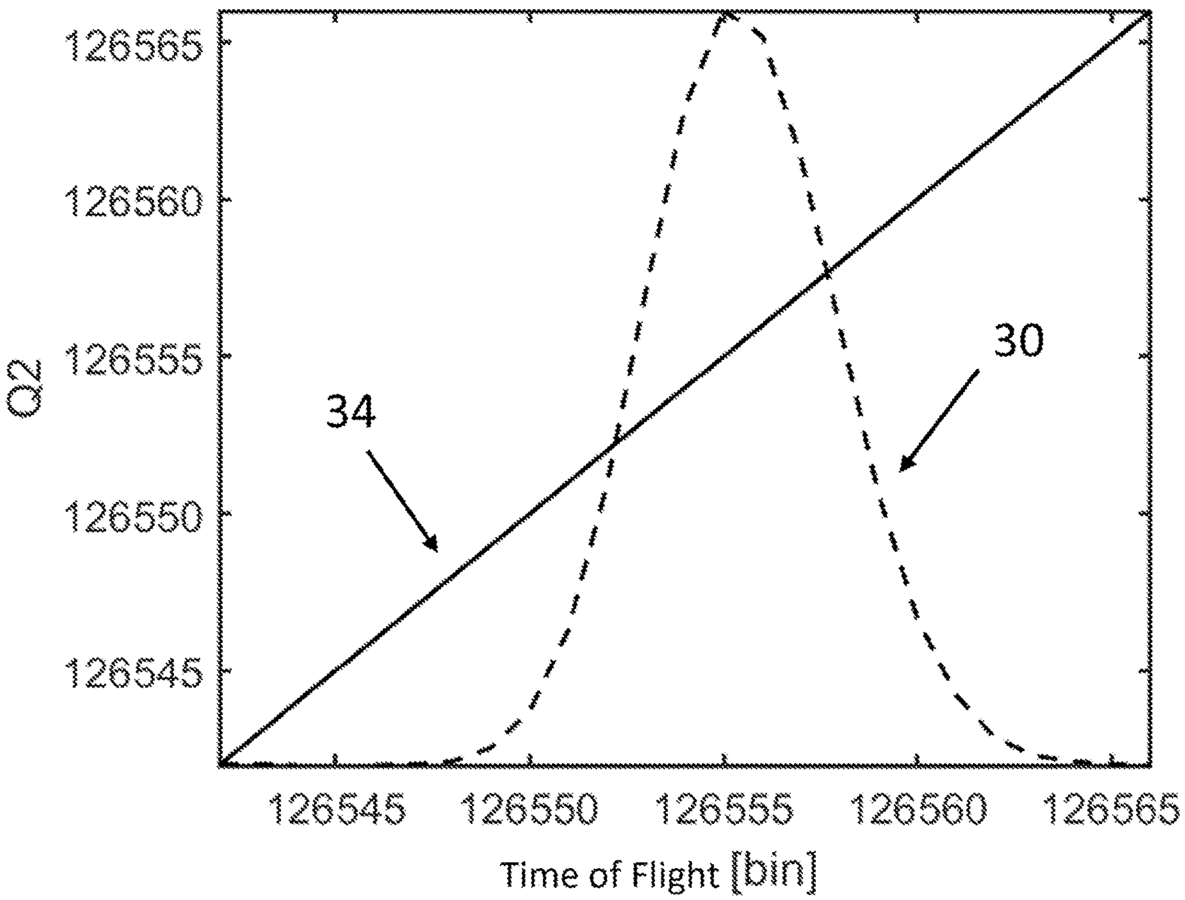

FIG. 3C shows a second quantification function (34) together with the composite signal (30). The second quantification function (34) is the (linear) time-of-flight axis. The summation of the signal (30), weighted with the second quantification function (34), gives a second weighted sum g2.

Figure 3D:
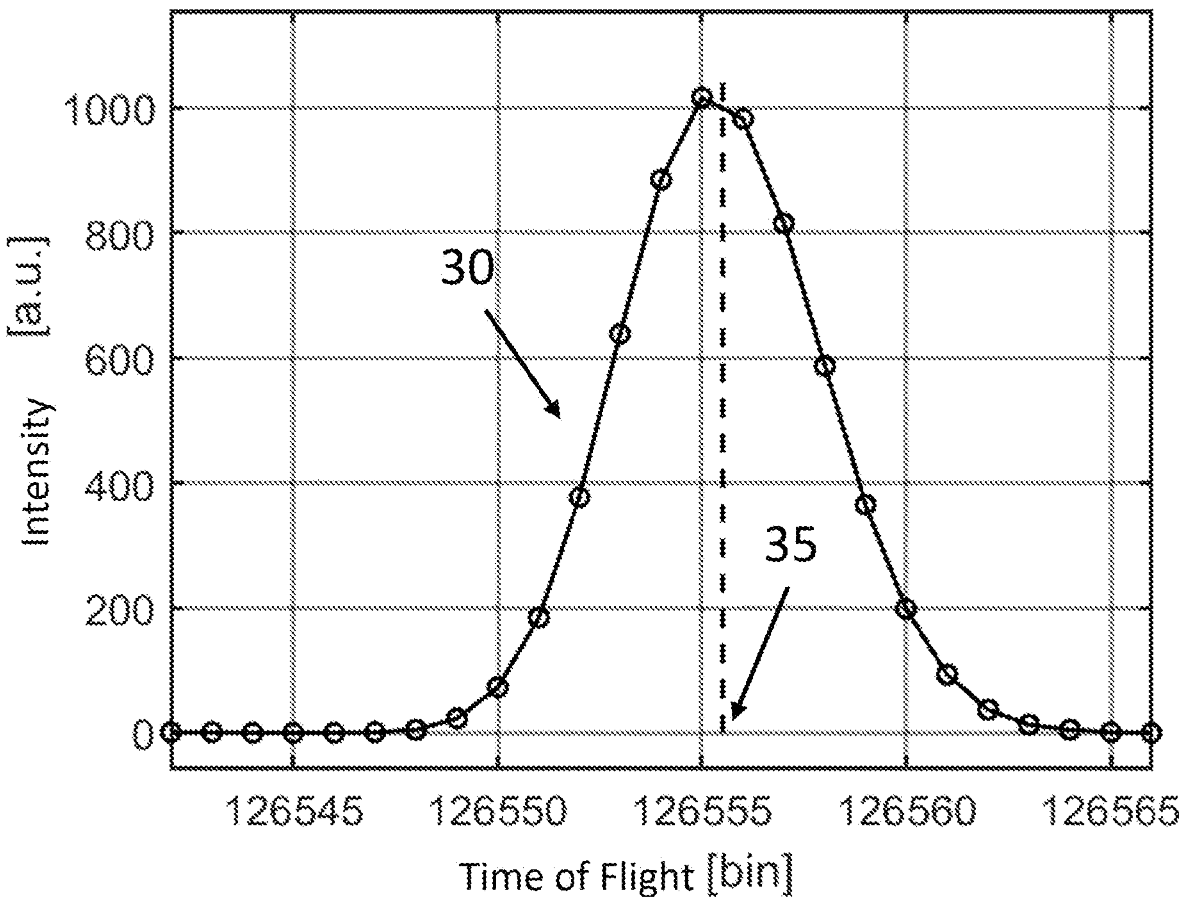

FIG. 3D shows the composite signal (30) together with the centroid (35) of the signal (30), which is shown as a dashed line and occurs as a derived quantity from the weighted sums: to =g2/g1.

Figure 3E:
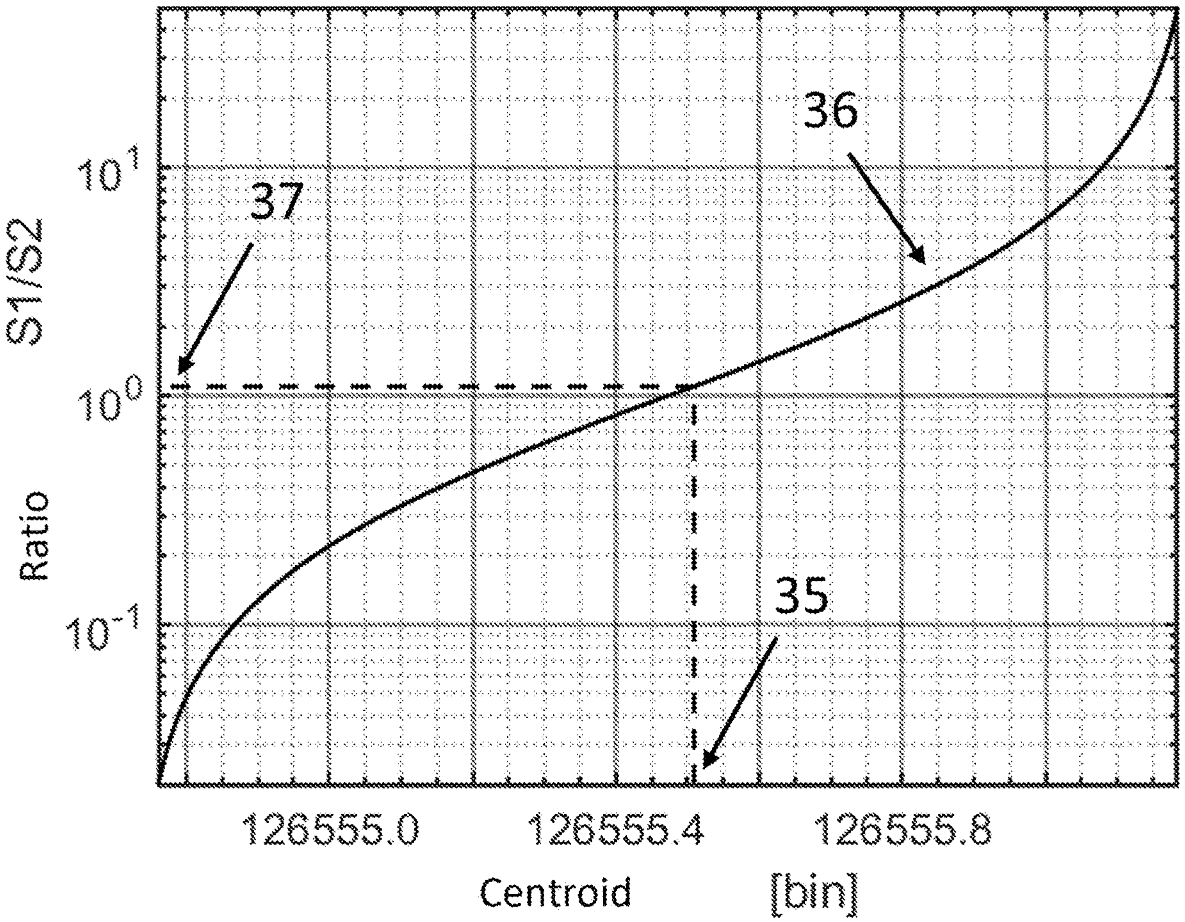

FIG. 3E is a logarithmic graphic representation of the prespecified lookup table (36), on whose abscissa (input values of the lookup table) the centroid of the composite signal is plotted, and on whose ordinate (output value of the lookup table) the intensity ratio of the signal components (31, 32) is plotted. In FIG. 3E, the centroid (35) calculated from the weighted sums g1 and g2 and the corresponding intensity ratio S2/S1 of the two signal components (31, 32) are represented by dashed lines. The intensity ratio is 1.1, and in this case is determined with a mean relative error of less than 0.5%.

FIGS. 4A to 4E show in a second embodiment how, for a signal (40), composed of two signal components (41, 42), the intensity ratio of the two signal components (41, 42) can be determined, by means of weighted sums and a prespecified lookup table (47).

Figure 4A:
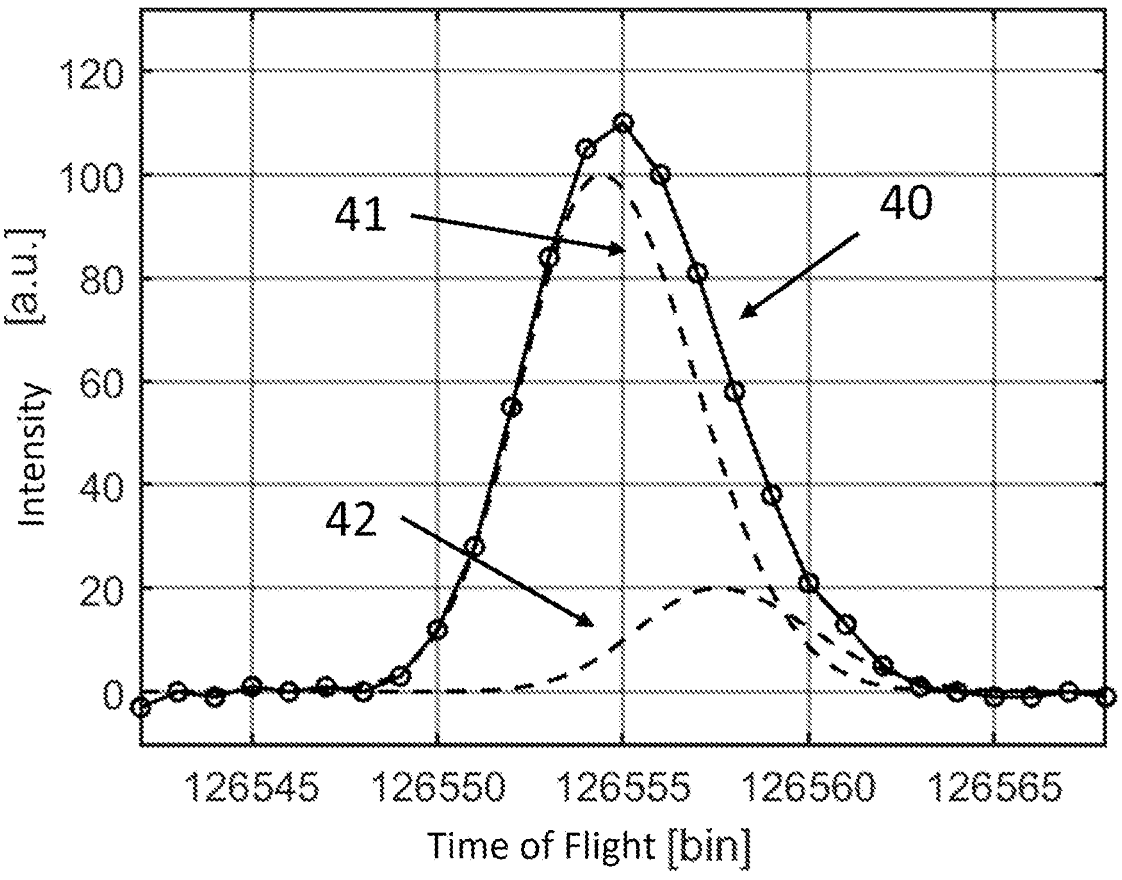
FIGS. 4A to 4E show in a second embodiment how, for a signal (40), composed of two signal components (41, 42), the intensity ratio of the two signal components (41, 42) can be determined, by means of weighted sums and a prespecified lookup table (47).

FIG. 4A shows a section from a simulated MS2 spectrum of a time-of-flight mass analyzer with the signal (40), which is composed of two signal components (41, 42) of two isobaric reporter ion species, which are not mass resolved in the MS2 spectrum. An analog detector signal with a noise component is scanned with a typical sampling rate of 5 GS/s (giga-samples per second) and digitized with a resolution of 10 bit. The circular symbols correspond to the digitized value pairs (time of flight, intensity) of the composite signal (40). The mass axis is a time-of-flight axis, where the scanning time points (bins) are given as whole numbers. The two isobaric reporter ion species have a mass of around 128 daltons and a mass difference of 6.3 millidaltons. The simulated MS2 spectrum has a mass resolution of around 12,000, whereas a mass resolution of 20,000 would be required in order to resolve the two signal components (41, 42) as separate signals.

Figure 4B:
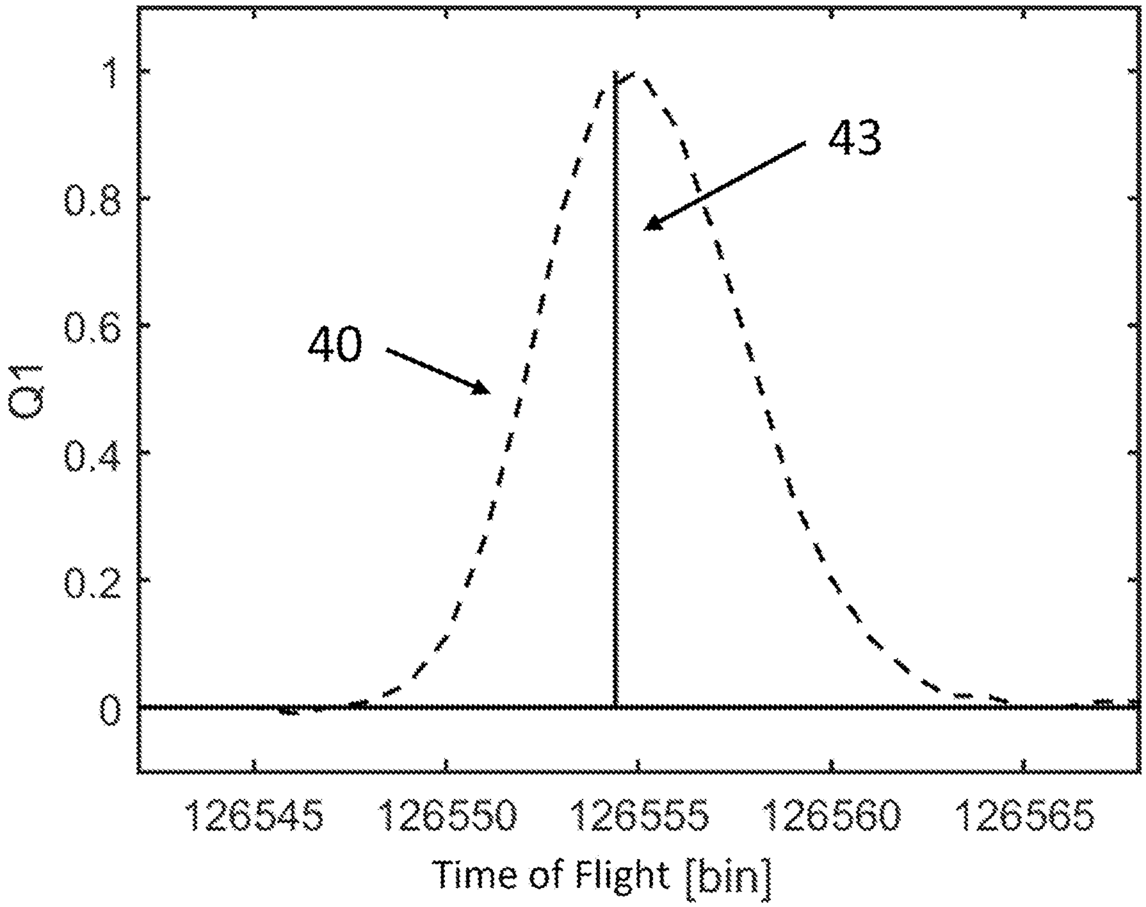

FIG. 4B shows a first quantification function (43) together with the composite signal (40). The first quantification function (43) is a delta function, which is centered at the maximum position of the first signal component (41). The summation of the signal (40), weighted with the first quantification function (43), gives a first weighted sum g1 and corresponds to an interpolation of the signal (40) at the position of the first delta function.

Figure 4C:
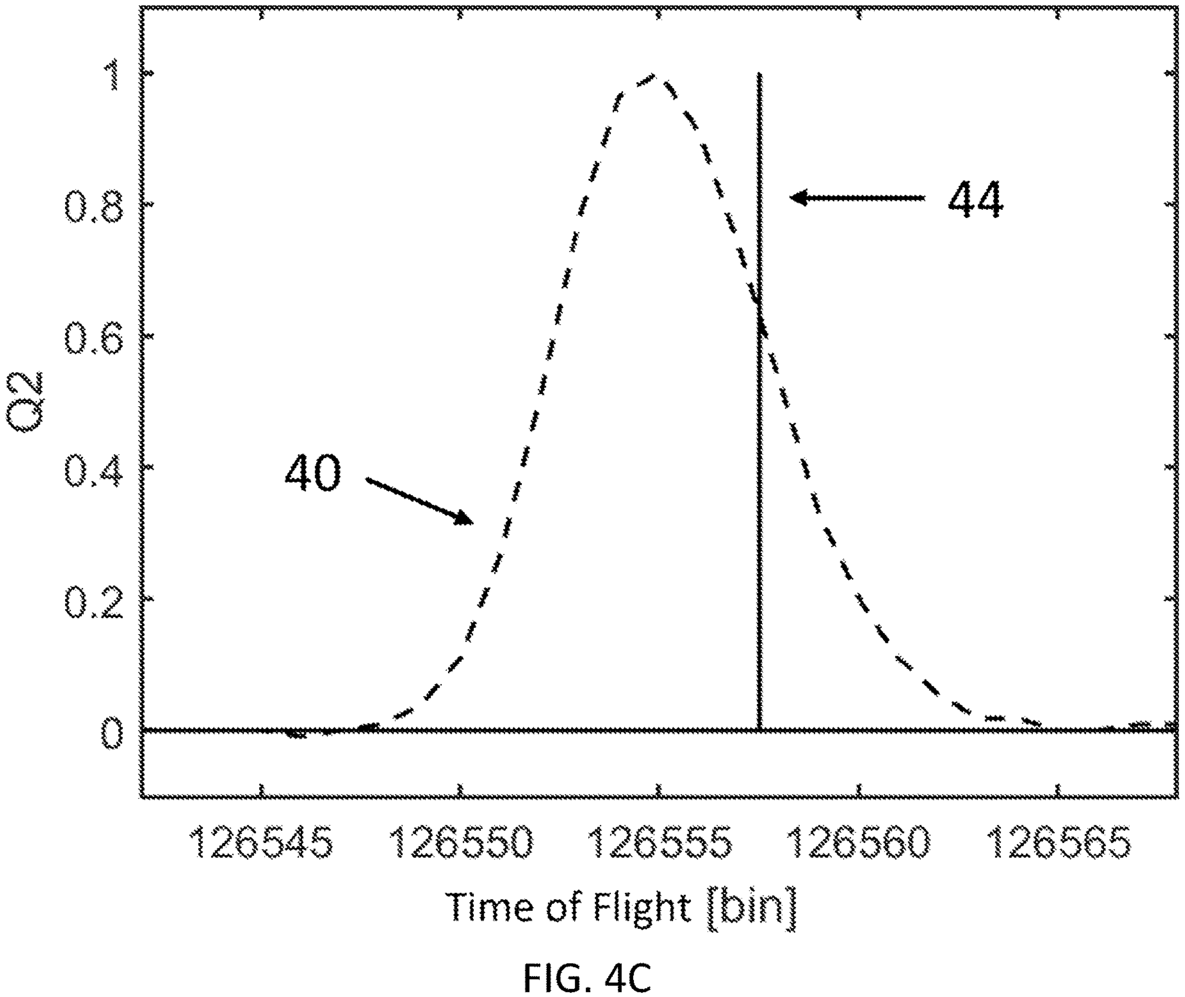

FIG. 4C shows a second quantification function (44) together with the composite signal (40). The second quantification function (44) is a delta function, which is centered at the maximum position of the second signal component (42). The summation of the signal (40), weighted with the second quantification function (44), gives a second weighted sum g2 and corresponds to an interpolation of the signal (40) at the position of the second delta function.

Figure 4D:
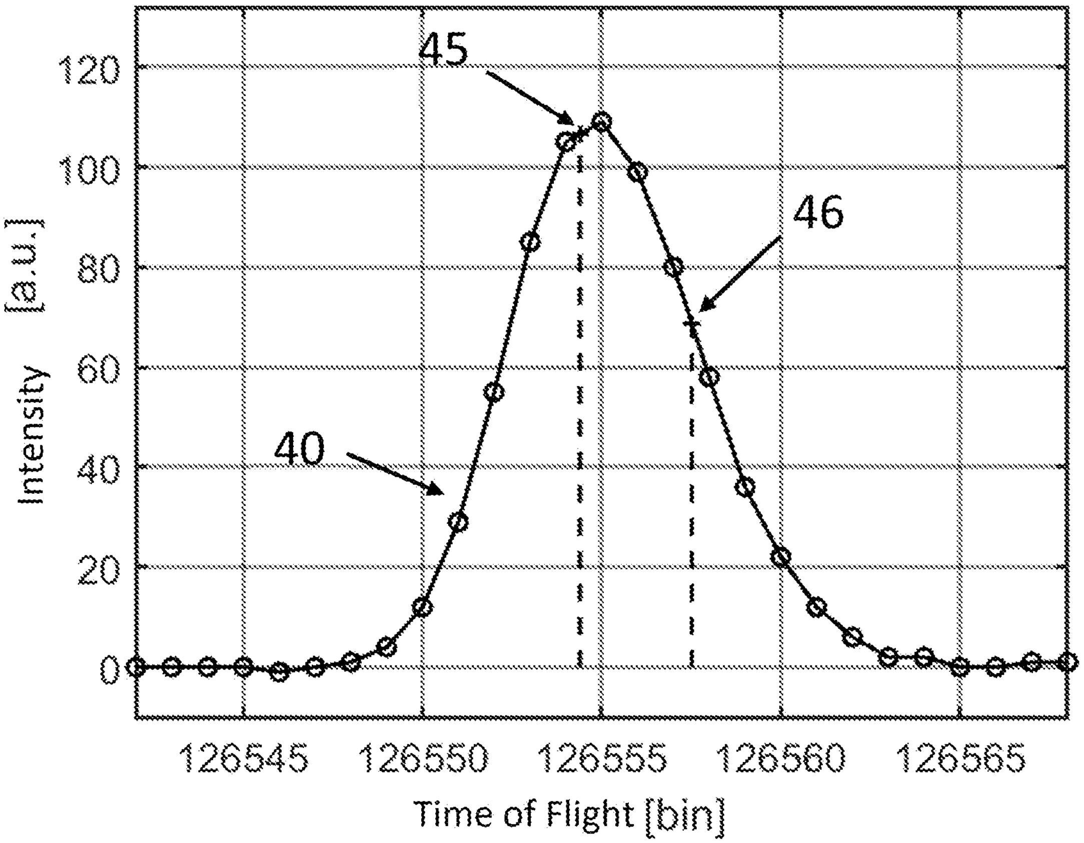

FIG. 4D shows the composite signal (40) with the interpolated signal values g1 (45) and g2 (46) at the positions of the two delta functions, which are shown as two cruciform symbols at the end of the dashed lines.

Figure 4E:
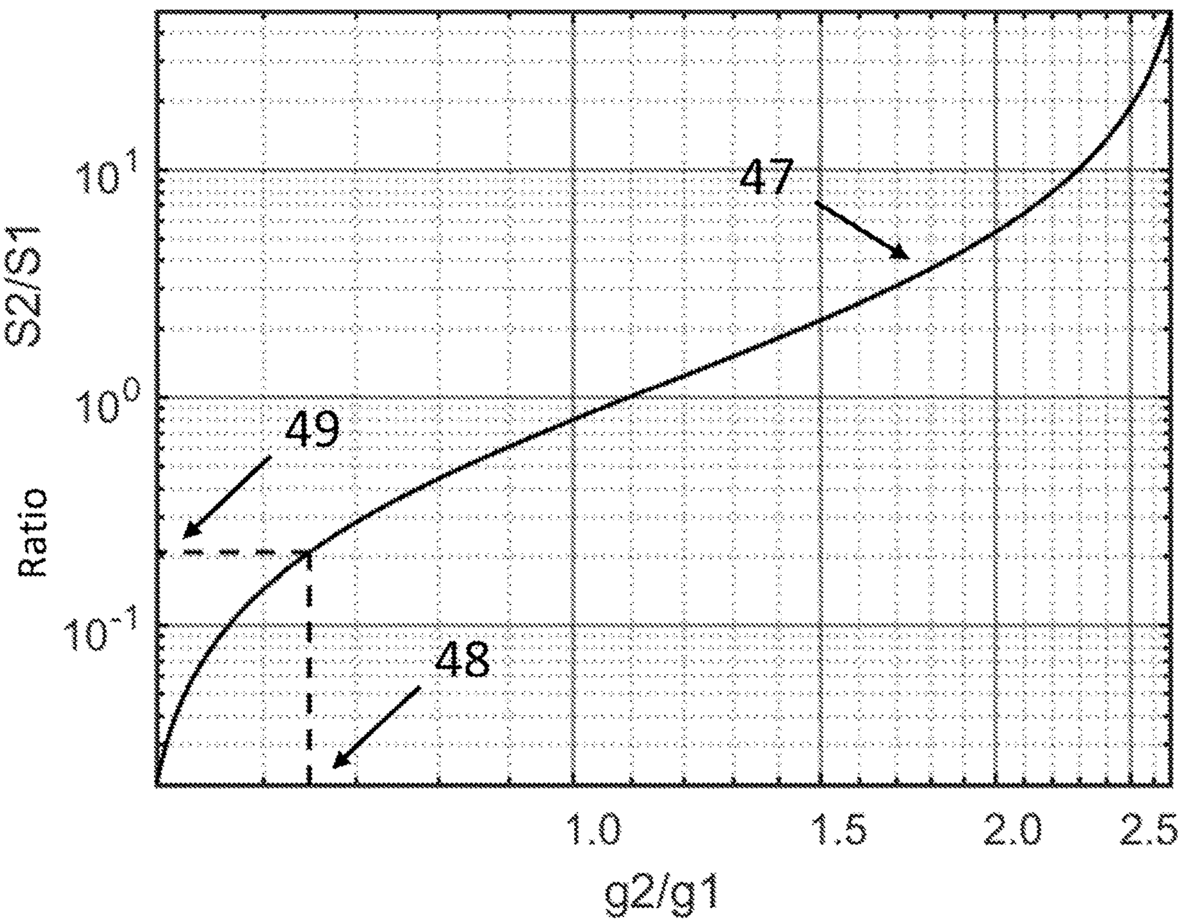

FIG. 4E is a logarithmic graphic representation of a prespecified lookup table (47), on whose abscissa (input values of the lookup table) the ratio of the weighted sum g2/g1 is plotted, and on whose ordinate (output value of the lookup table) the intensity ratio S2/S1 of the signal components (41, 42) is plotted. In FIG. 4E, the ratio g2/g1 (48) and the corresponding intensity ratio S2/S1 (49) of the two signal components (41, 42) are represented by dashed lines. The intensity ratio is 0.2 and is determined here with a mean relative error of less than 7.5%. The mean relative error is greater than in the previous embodiment because the intensity ratio is closer to the margin of the lookup table, and the intensity of the composite signal (40) from the example of FIGS. 4A-E is considerably lower than the intensity of the composite signal (30) from the example of the FIGS. 3A-E.

Figure 5A:
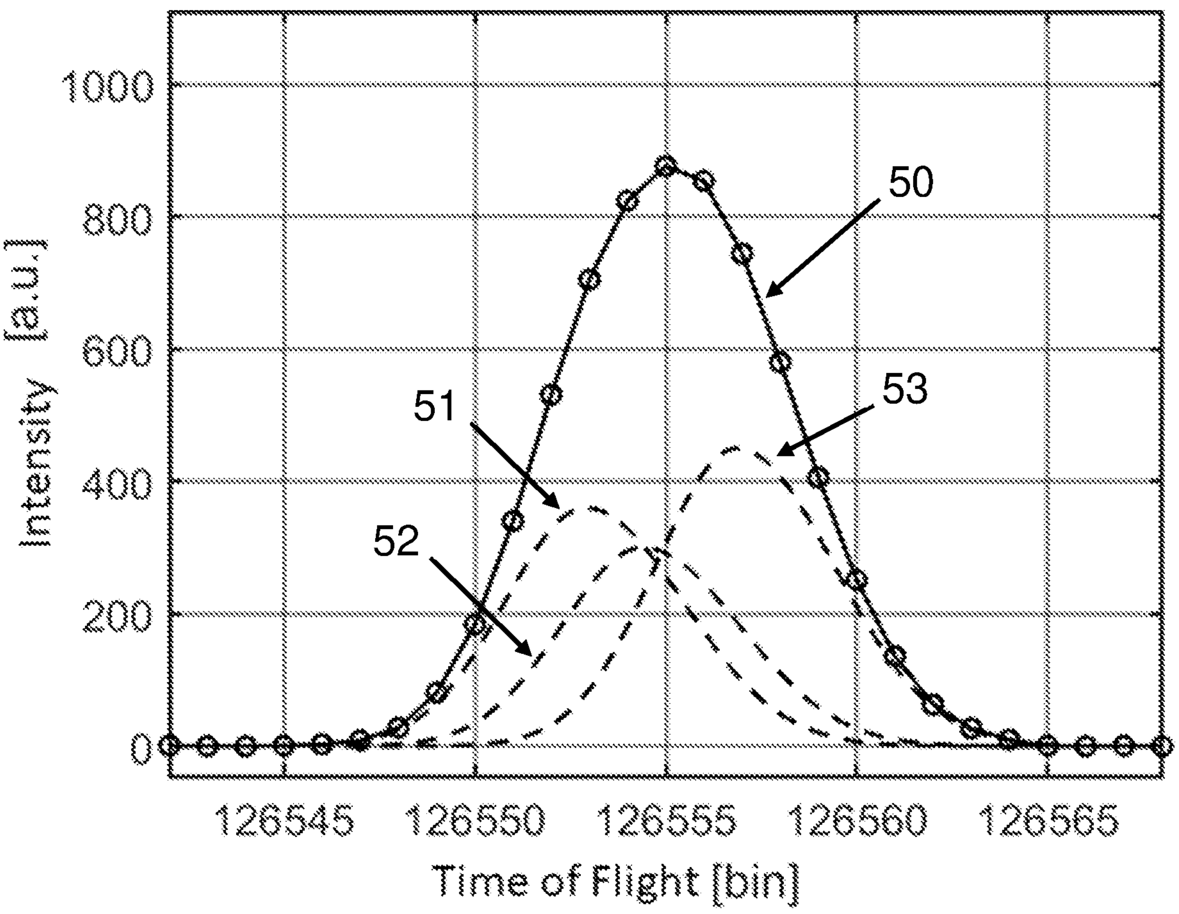
FIG. 5A shows a section from a simulated mass spectrum of a time-of-flight mass analyzer with a signal (50), which is composed of three signal components (51, 52, 53) of target ion species, which are not mass resolved in the mass spectrum.

FIG. 5A shows a section from a simulated mass spectrum of a time-of-flight mass analyzer with a signal (50), which is composed of three signal components (51, 52, 53) of target ion species, which are not mass resolved in the mass spectrum. An analog detector signal with a noise component is scanned with a typical sampling rate of 5 GS/s (gigasamples per second) and digitized with a 10-bit resolution. The circular symbols correspond to the digitized value pairs (time of flight, intensity) of the composite signal (50). The mass axis is a time-of-flight axis, where the scanning time points (bins) are given as whole numbers. The three target ion species have a mass of around 128 daltons. The mass difference between the center and the left-hand signal component (52, 51) is 3 millidaltons. The mass difference between the center and the right-hand signal component (52, 53) is 5 millidaltons.

Figure 5B:
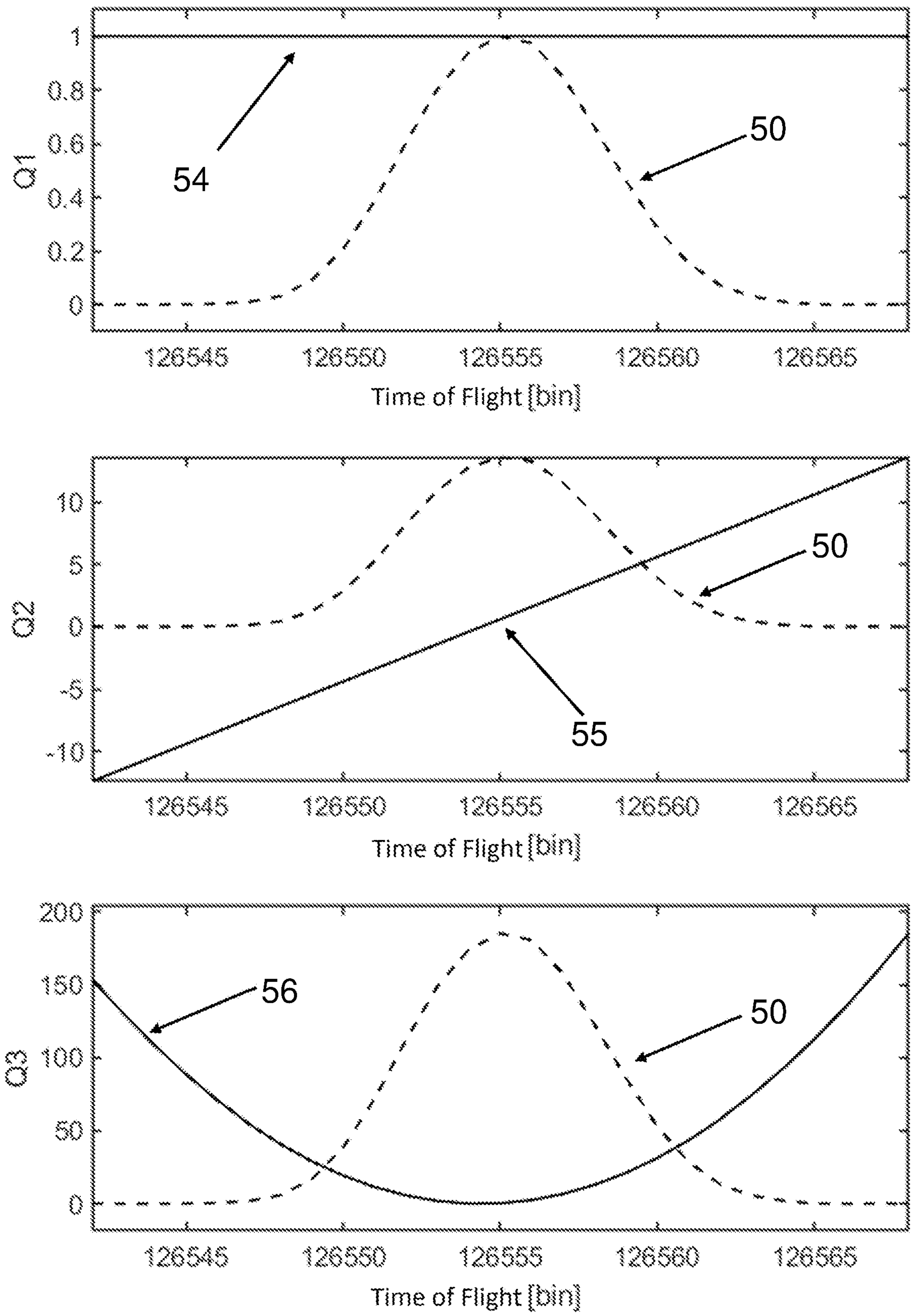
FIG. 5B shows three quantification functions (54, 55, 56), each together with the composite signal (50), with which the signal (50) is weighted to calculate three weighted sums, which are used as the inhomogeneous part of a system of linear equations. The intensities of the three signal components (51, 52, 53) provide the direct solution of the system of linear equations.

FIG. 5B shows three quantification functions (54, 55, 56), each together with the composite signal (50).

The first quantification function (54) is a constant function of value one. The summation of the signal (50), weighted with the first quantification function (54), gives a first weighted sum g1. The second quantification function (55) is a (linear) time-of-flight axis, whose zero crossing is shifted to the maximum position of the center signal component (52). The summation of the signal (50), weighted with the second quantification function (55), gives a second weighted sum g2. The third quantification function (56) is the squared second quantification function (55). The summation of the signal (50), weighted with the third quantification function (56), gives a third weighted sum g3.

The relative intensities Ii (i=1 . . . 3) of the three signal components (51, 52, 53) result as the solution of the system of linear equations:

$$\begin{pmatrix} \int Q_1(x)\cdot S_1(x)dx & \int Q_1(x)\cdot S_2(x)dx & \int Q_1(x)\cdot S_3(x)dx \\ \int Q_2(x)\cdot S_1(x)dx & \int Q_2(x)\cdot S_2(x)dx & \int Q_2(x)\cdot S_3(x)dx \\ \int Q_3(x)\cdot S_1(x)dx & \int Q_3(x)\cdot S_2(x)dx & \int Q_3(x)\cdot S_3(x)dx \end{pmatrix} \begin{pmatrix} I_1 \\ I_2 \\ I_3 \end{pmatrix} = \begin{pmatrix} g_1 \\ g_2 \\ g_3 \end{pmatrix}$$

where Qi(x) is the quantification functions and Si(x) the individual normalized signal components and the weighted sums gi form the inhomogeneous part of the system of equations. The individual signal components Si(x) can be acquired in a prior measurement. The average relative error of the intensity ratios between the signal components is less than 1% in this example.

The invention has been described above with reference to different, specific example embodiments. It is to be understood, however, that various aspects or details of the example embodiments described can be modified without deviating from the scope of the invention.

The invention claimed is:

1. A method for mass spectrometric quantification of two or more known target ion species, each of which has a known mass value which is different for at least two of the species, the target ion species being isobaric fragment ion species produced by fragmentation from precursor ion species labeled with isobaric mass tags, the method comprising the steps:

providing a mass spectrum acquired with a mass spectrometric system from a sample material that produces, in the mass spectrum, a composite signal composed of signal components of the two or more target ion species, which are not mass resolved in the mass spectrum, providing a plurality of predetermined quantification functions that are linearly independent from one another, wherein a total number of said quantification functions is equal to or greater than a total number of said target ion species, determining weighted sums by summing the composite signal weighted with the quantification functions, using the weighted sums as an inhomogeneous part of a system of linear equations, and determining a solution of said system of linear equations in the form of at least one quantification parameter that indicates the relative intensities of the signal components of the two or more target ion species; and outputting the relative intensities, or ratios of the relative intensities, of each of the measured fragment ion species based on the value of the at least one quantification parameter.

2. The method according to claim 1, wherein the quantification functions are (a) polynomials of different order, (b) delta functions or rectangular functions, which are all preferably centered near the respective maximum position of the target ion species, (c) step functions, where each step position is preferably near the respective maximum position of the target ion species, (d) harmonic functions of different periodicity, or (e) functions used for a wavelet transform.

3. The method according to claim 1, wherein the signal is composed of the signal components of two target ion species.

4. The method according to claim 3, wherein the quantification functions comprise a constant function of value one and a mass axis of the acquired mass spectrum, and the centroid of the signal is calculated from the two weighted sums, where the centroid is used as the input value of a lookup table to determine a ratio of the intensities of the two signal components of the two target ion species.

5. The method according to claim 3, wherein the composite signal is weighted with delta functions at each of the known masses of the two target ion species, the weighted sums corresponding to interpolated signal values at the maximum positions of the two target ion species, from whose ratio the ratio of the two signal components of the two target ion species is determined by means of a lookup table.

6. The method according to claim 1, wherein the precursor species all have a same species of biomolecule and are each labeled with different isobaric mass tags, each of which has a reporter group and a mass balance group, and where the precursor ion species are isolated from other precursor ion species regarding mass, and optionally isolated regarding mobility in addition, before the fragmentation.

7. The method according to claim 6, wherein the isobaric fragment ion species have isobaric reporter groups.

8. The method according to claim 1, wherein several mass spectra with the signal are provided, where the weighted sums are calculated separately in each case for individual mass spectra or for partially summed mass spectra before being summed separately according to the predetermined quantification functions to determine quantification parameters therefrom.

9. The method according to claim 8, wherein the weighted sums are each calculated separately for each mass spectrum and afterwards summed separately, according to the predetermined quantification functions, to determine the quantification parameters therefrom.

10. The method according to claim 1, wherein several mass spectra with the signal are provided, where the weighted sums are calculated separately in each case for individual mass spectra or for partially summed mass spectra, and quantification parameters for the individual mass spectra or partially summed mass spectra are determined therefrom.

11. The method according to claim 10, wherein first quantification functions are used for a separate calculation of the weighted sums of a first individual mass spectrum or a first partially summed mass spectrum, and second quantification functions are used for a separate calculation of the weighted sums of a second individual mass spectrum or a second partially summed mass spectrum, where the first and second quantification functions are different.

12. A device for the quantification of two or more target ion species comprising a data processing unit which is designed and configured to execute a method according to claim 1.

* * * * *